Oct. 25, 1960  B. ANDREESSEN  2,957,290
OLIVE PACKING MACHINE
Filed Feb. 3, 1960  4 Sheets-Sheet 1

INVENTOR.
Bernhard Andreessen
BY
ATTY

Oct. 25, 1960 B. ANDREESSEN 2,957,290
OLIVE PACKING MACHINE
Filed Feb. 3, 1960 4 Sheets-Sheet 2

INVENTOR.
Bernhard Andreessen
BY
ATTY

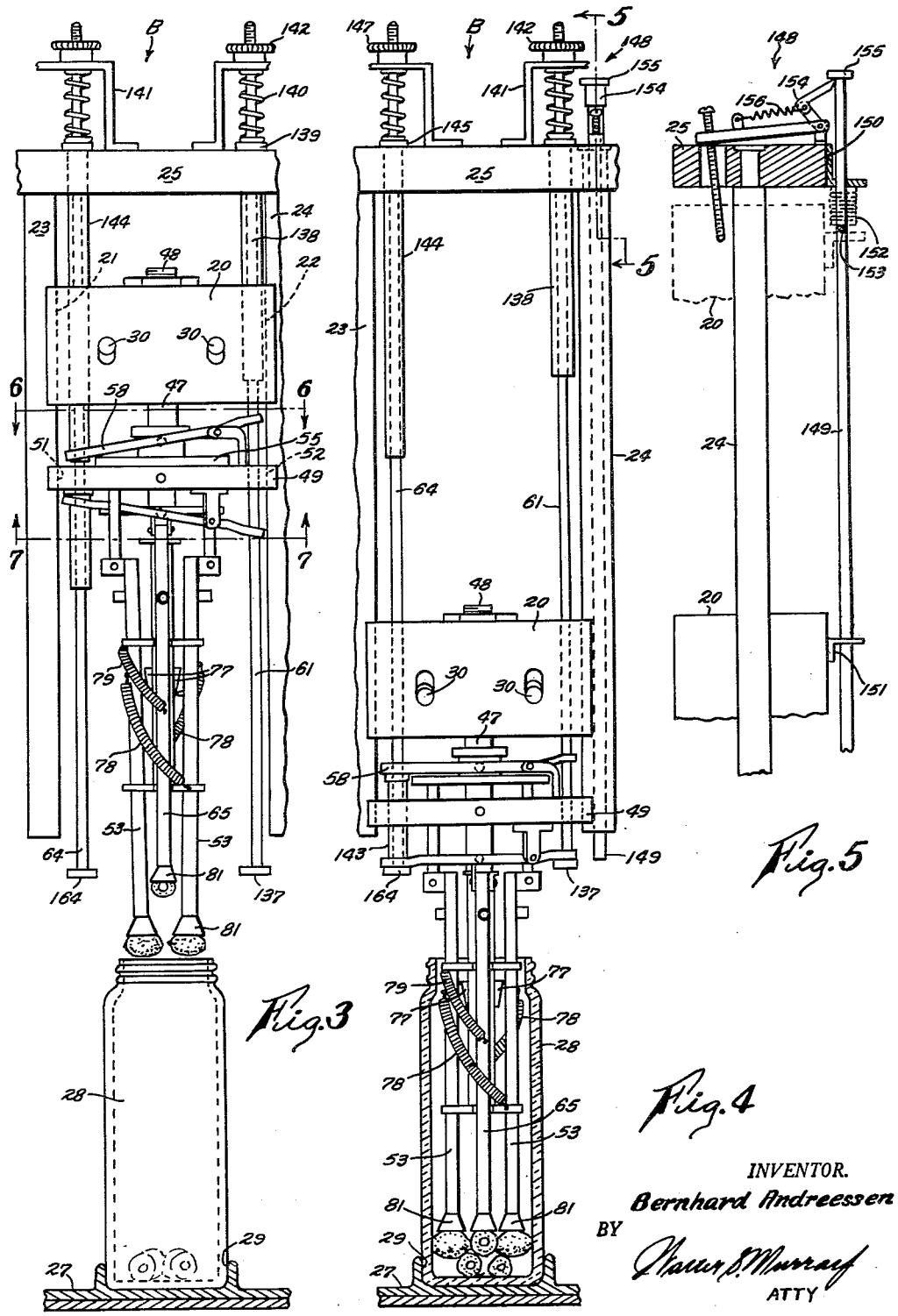

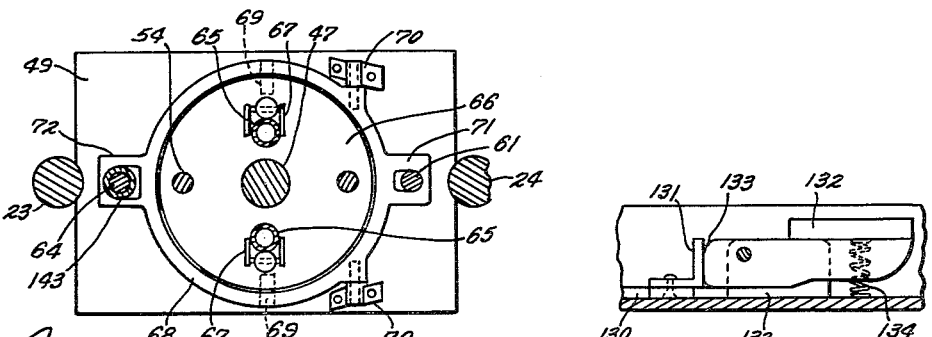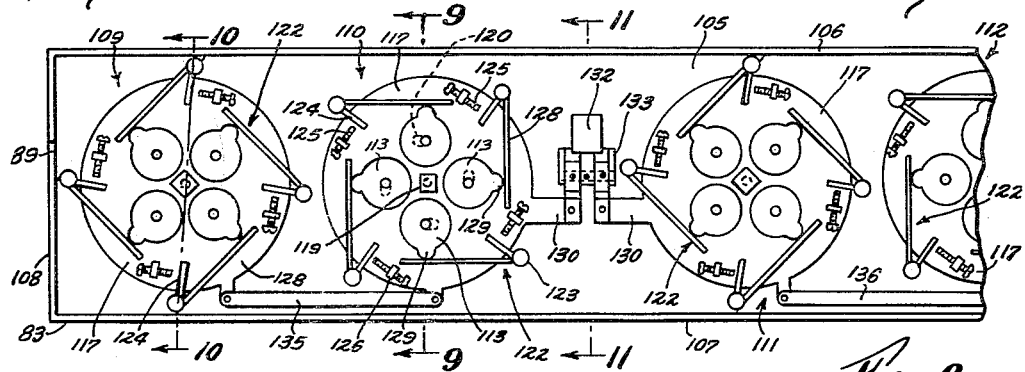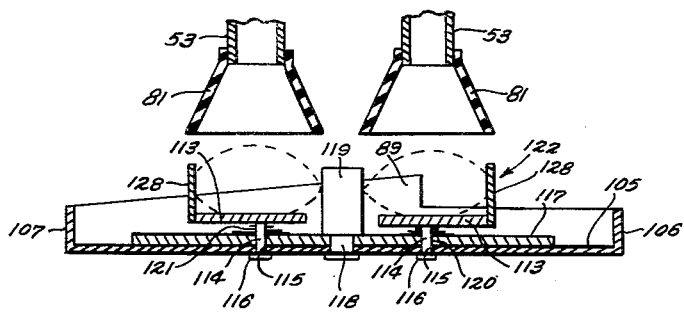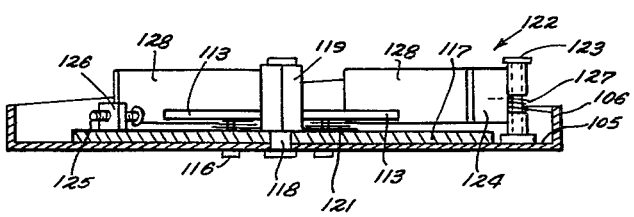

United States Patent Office 2,957,290
Patented Oct. 25, 1960

2,957,290
OLIVE PACKING MACHINE
Bernhard Andreessen, 289 McCormick Ave., Cincinnati, Ohio
Filed Feb. 3, 1960, Ser. No. 6,502
8 Claims. (Cl. 53—240)

The present invention relates generally to machines for packing small articles in containers and more particularly to an improved machine for simultaneously transferring at each of a plurality of successive stations a course or layer of pimientoed olives from tray-type conveyors to packed positions within containers, such as the conventional glass jars that have restricted or necked-in openings, that are advanced through the machine from station-to-station.

Heretofore, in the prior art, it has generally been the practice to provide olive packing machines that are limited to the delivery of single olives to a packed position in a container which materially reduced the capacity of these machines or to machines that have plural transfer devices which recurrently pack olives into the same container.

These difficulties are avoided in the olive packing machine of my invention by providing a novel olive transfer device at a plurality of successive stations which cooperates with tray conveyor devices to effect positive transfer of a course or layer of olives from the conveyor to the transfer station device and which assures dependable transport and accurate placement of the olives within containers or jars intermittently advanced from station-to-station.

It is thus the primary object of my invention to provide an improved olive packing machine that will assure dependable transfer of a complete course or layer of olives, from a tray conveyor to within the jar and to provide accurate placement of all of the olives in said course in their respective positions within the jar.

Another object of the invention is to provide transfer mechanism that is readily adjusted to handle the average size and shape of the olives in any particular run of olives to be passed through the machine.

A further object of the invention is to provide a novel and dependable means for passing a course of stuffed olives from a tray conveyor to an olive transfer device.

Other objects and advantages of my invention will appear from the following specification and accompanying drawings, and the novel features thereof will be pointed out in the appended claims.

In the drawings:

Fig. 3 is a fragmental, front elevational view of one station of my olive packing machine, showing the head thereof in an intermediate olive feeding position.

Fig. 4 is a fragmental, front elevational view of the station illustrated in Fig. 3 showing the machine parts in positions for depositing a course or layer of olives in a jar.

Fig. 5 is a section taken on line 5—5 of Fig. 4.

Fig. 7 is an enlarged section taken on line 7—7 of Fig. 3.

Fig. 8 is a fragmental, plan view of one of several olive trays required for the operation of the machine shown in Figs. 1–7 of the drawings.

Fig. 9 is an enlarged section taken on line 9—9 of Fig. 8 showing several olive cups in position to pick up olives from the tray, said cups being illustrated in central section.

Fig. 10 is an enlarged section taken on line 10—10 of Fig. 8.

Fig. 11 is a fragmental, enlarged section taken on line 11—11 of Fig. 8.

Figure 1:
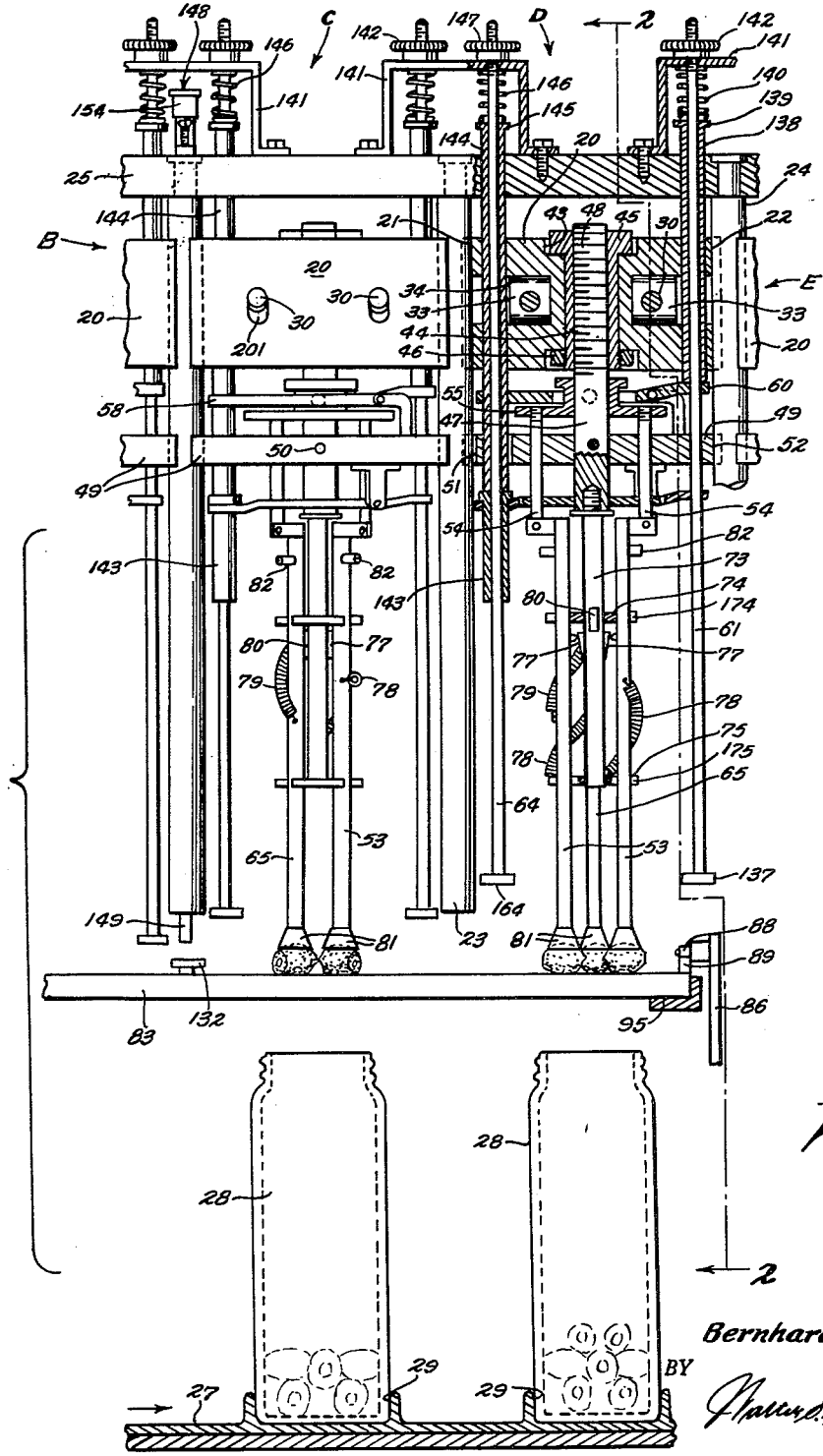
Fig. 1 is a fragmental, front elevational view of my olive packing machine in olive pick up position, parts thereof being broken away and shown in central section.
Figure 2:
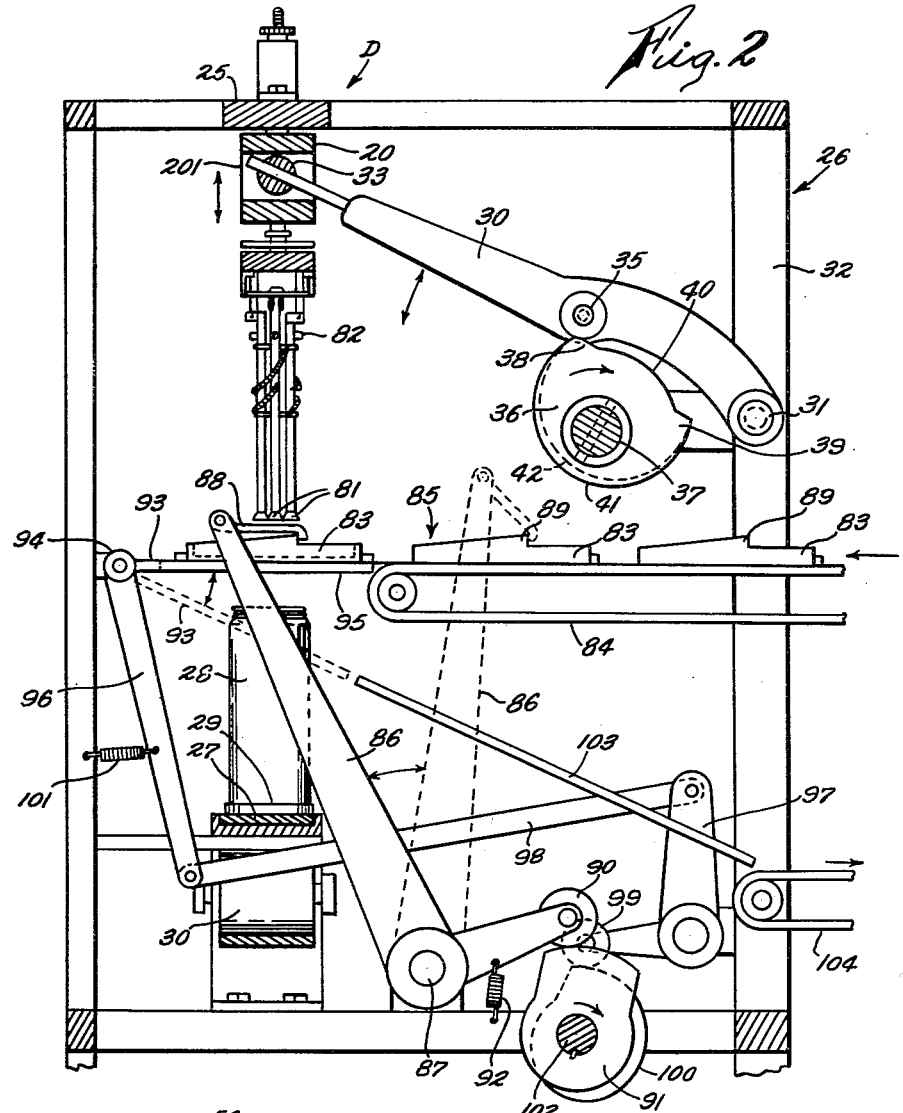
Fig. 2 is a section taken along line 2—2 of Fig. 1 depicting the general machine parts on a somewhat reduced scale.

Referring now to Fig. 1 of the drawings, the letters B, C, D and E designate consecutive transfer stations of my olive packing machine which are substantially identical in structure and functions. My machine has a maximum of sixteen (16) olive transfer stations, the number of stations in operation for a particular run being dependent on the number of layers or courses required to fill the jars to be filled by the run. Each of the stations has a vertically reciprocated head 20 that is provided with opposed, outwardly facing grooves 21 and 22 in sliding engagement with vertical guide rods 23 and 24, respectively, fixedly mounted at their upper ends in a longitudinal member 25 of my machine frame 26. A suitable, intermittently operated conveyor 27 is mounted on the frame 26 for the purpose of advancing a succession of jars 28 from station to station and for supporting each successive jar in packing positions at the several station. To this end the conveyor may be of the endless belt type and have its upper reach movable in a horizontal plane directly beneath all of the heads 20 at the several olive transfer stations, said belt being provided with a number of longitudinally spaced apart jar holding sockets 29 which grip the bottom portions of the jars and prevent dislodgement or rotation of the jars as they are moved through the machine on the conveyor. The sockets are spaced apart a distance which will bring their centers into vertical alignment with the vertical center lines of the heads in order that with each advance of the endless belt a jar will be advanced from station to station and accurately located in a position under each head to receive the course of olives to be transferred at each station. As best shown in Fig. 2 the endless belt may run over an end pulley 30 driven by a suitable motor (not shown) that is intermittently operated during dwell periods of the heads.

With reference to Fig. 2, which depicts olive transfer station D of my machine, the head 20 is vertically reciprocated by a lever 30 having one end pivotally mounted at 31 to an upstanding member 32 of the frame 26. The opposite end of the lever is bifurcated and is longitudinally slidable in two cylindrical blocks 33 journaled in lateral bores 34 formed in the head 20. The bifurcated ends of the lever 30 have pivotal movement relative to the head by means of slots 201 formed through the head and in which the bifurcated end is received. An intermediate portion of the lever has a follower roller 35 mounted thereon which engages upon the periphery of a rotatable cam 36 fixed on a continuously driven shaft 37 that extends longitudinally through the machine behind the stations. The shaft 37 is journaled on the machine frame in any suitable manner. As indicated in Fig. 2 the cam 36 has two angularly spaced apart high spots 38 and 39, an intermediate portion 40 between one side of the high spots and a lever feed and return portion 41 opposed to the intermediate portion 43. The heads 20 at all of the stations B, C, D and E are operated by reciprocating devices like cam 36 and lever 30 and all of said cams for the various stations have identical pairs of spaced apart high spots 38 and 39 and intermediate portions 40, the feed and return portions varying from station to station as indicated by dotted lines 42 in Fig. 2 to control the feed and return strokes at the various stations depending upon the level of packed olives in the jars at successive stations, as will more fully appear hereinafter.

Referring now to Fig. 1 of the drawing each head 20 has a centrally located, vertical bore 43 formed therethrough for receiving an internally threaded boss 44 that is rotatable therein and is locked against axial and rotatable movement in the head by the expediency of forming an integral flange 45 at its upper end whilst the lower end of the boss is threaded in a nut 46. A rod 47 is provided at its upper end with external threads 48 which are threaded in the boss 44 whilst the lower end of the rod has a smooth external surface and depends vertically from the center of the head. A head section 49 is fixed to the central part of the depending end of the rod by means of a pin 50 and has side grooves 51 and 52 formed therein for sliding engagement with the guide rods 23 and 24, respectively. Thus, it will be seen that the relative position of the head section 49 with respect to the main head 20 may be adjusted by loosening the nut 46 to permit free rotation of the boss 44 whereupon the threaded connection between the boss and the rod 47 will be operated to raise or lower the head section 49 relative to the main head 20 after which the boss may be again tightened in the head by pulling upon the nut 46.

Figure 6:
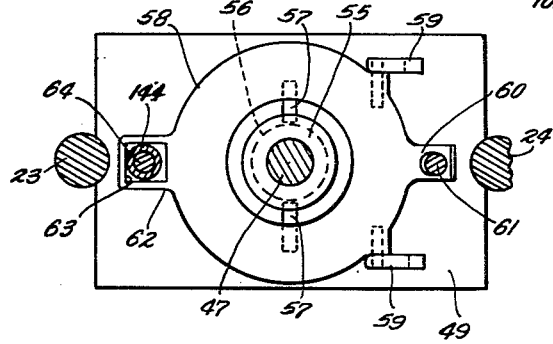
Fig. 6 is an enlarged section taken on line 6—6 of Fig. 3.

The drawings illustrate one embodiment of my invention wherein the mechanism at each of the successive stations B, C, D and E is adapted to transfer four olives at a time from a tray conveyor into the jar at said station. That number of transferred olives is shown because it represents the number of olives required to complete one layer or course of olives for the particular size and type of jar being run through the machine. It is contemplated that the machine of my invention could be adapted to handle olive jars requiring any number of layers or courses and any number of olives in each layer, it being only necessary to divide the required number to be transferred at each station into two sets or groups of olives for handling by my machine at each station, as will be understood hereinafter. As best seen in Fig. 1 a first set of olive pick up arms 53—53 are located below the head section 49 and are each pivoted at their upper ends to a vertically shiftable hanger mounted on the head and comprising slide rods 54—54 vertically slidable in the head section 49 and threaded at their upper ends to a control member 55 that is slidably mounted on the rod 47. With reference to Fig. 6 it will be seen that the control member 55 is provided with a groove 56 that receives a pair of opposed trunnions 57—57 that are anchored in a ring 58 encircling the control member. The ring is pivotally mounted upon the head section 49 between a pair of pivot mountings 59—59 secured to the head section, said ring member having an extension 60 on one side of the pivot that loosely receives a control rod 61 depending from the frame member 25 whilst an extension 62, projecting from the opposite side of the ring member, has an enlarged opening 63 for loosely receiving a control rod 64 depending from the frame member 25.

A second set of olive pick up arms 65—65 is carried by the head and alternates with the set of arms 53—53 and, as best shown in Fig. 7, said arms 65—65 are pivotally mounted at their upper ends to a vertically shiftable hanger comprising a control disk 66 slidable on the rod 47 and having a pair of brackets 67—67 fixed to the underside of the disk for pivotally mounting the arms 65—65. A ring 68 encircles the disk 66 and is pivotally mounted thereto on trunnions 69—69, said ring being pivoted to the underside of the head section 49 on opposed brackets 70—70 fixed to the underside of said head section. The ring has one extension 71 on one side of the pivot 70—70 that has a hole therethrough for loosely receiving the control rod 61 whilst the opposite side of the ring has an extension 72 that has a hole therein through which the control rod 64 passes.

A stem 73 is positioned co-axially on the end of the rod 47 centrally between the sets of arms 53—53 and 65—65, said stem carrying several guide disks 74 and 75 (Fig. 1) that are vertically spaced from each other and each have an angularly spaced apart row of radially extending notches 174 and 175, respectively, formed in the peripheries of their respective body portions. Opposed slots on both guide disks receive intermediate portions of the sets of arms in order that the sets may have both vertical and lateral guided movement on the head.

With reference to Fig. 1 it will be seen that downwardly and inwardly inclined cam surfaces 77—77 are formed on opposite sides of the stem 73 for engaging cam followers on each of the arms 53—53. Contractile springs 78—78 are connected at common ends to the arms at points located between the guide disks 74 and 75 and are connected at their common opposed ends to the guide disk 75. Thus the arms 53—53 will be continuously biased downwardly or away from the head by the springs, whilst the particular manner of wrapping the springs around the arms biases the arms to radially contracted positions within the grooves in the guide disks and continuously maintain the cam followers on the said arms against the cams 77—77. In a like but vertically opposite manner the set of arms 65—65 are continuously biased upwardly or toward the head by contractile springs 79—79 which are connected at common ends to a portion of the arms 65—65 located between the guide disks 74 and 75 whilst the opposed ends are connected to the guide disk 74. Upwardly and inwardly inclined cam surfaces 80—80 are formed on opposite sides of the stem 73 and engage cam followers on the arms 65—65.

All the arms in the sets are hollow, have their upper ends closed off and have olive retaining means such as rubber suction cups 81 mounted on their lower ends. Hose connections 82 are located on the upper ends of the hollow arms for connecting the interiors of the arms and the suction cups to a source of negative and positive air pressure to either pick up olives in the cups or discharge said olives as required by the successive operations of the machine stations. The pressure and vacuum hose connections and their sources of pressure have been omitted from the drawings as they are well known in the art and such showing would tend to interfere with a clear understanding of the drawings.

My machine includes a novel olive tray 83 depicted in Figs. 8–11 of the drawings as having the capacity to serve four olive transfer stations of my machine. With reference to Fig. 2 the numeral 84 indicates an intermittently operated conveyor means which moves successive trays 83 to a position indicated as 85 where each tray may be engaged by a synchronized part of the machine and moved thereby into olive transfer positions at four consecutive stations. The synchronized machine part is shown in Fig. 2 as having a bell crank 86 pivotally mounted at 87 to the machine frame whilst the end of the long arm thereof has a downwardly urged spring finger 88 which engages over a shoulder 89 formed on the side walls of the tray 83. The short arm of the lever 86 carries a roller 90 which is urged against the periphery of a cam 91 by means of a contractile spring 92 secured to the short arm of the crank 86 and to a part of the frame 26. The tray 83 is supported in pick up position at the station by means of a pivoted member 93 having a solid hub 94 pivotally mounted on the frame 26 and a pair of spaced apart arms 95 in the form of angle irons which slidably engage the sides and undersides of the tray 83. The hub 94 is fixed to a lever 96 which is connected at its end to a bell crank 97 by means of a link 98, said bell crank having a follower 99 thereon which engages the periphery of a cam 100, said follower 99 being held in engagement with the cam by means of a contractile spring 101 secured to the lever 96 and a part of the machine frame 26. The cams 91 and 100 are keyed to a driven shaft 102 which extends the entire longitudinal dimension of the machine frame and is suitably journaled therein so that a set of like cams will be available at each group of four consecutive stations of my machine. For each revolution of the cam 91 it will be understood that a tray 83 will be moved from the position 85 to a pick up position beneath the heads 20 at four machine stations and that after the tray has been moved to said pick up position the lever 86 will be returned to dotted line position for the next cycle. After the tray has been delivered to the pick up position it will rest there for some time until a low point on the cam 100 is engaged by the follower wheel 99 at which time the tray will be lowered into the dotted line position shown in Fig. 2 at which time the tray will slide down a chute 103 and be carried off by a conveyor 104 for cleaning and refilling with olives.

With reference to Figs. 8-11 of the drawings the tray structure 83 comprises a bottom 105, narrow upstanding end walls 106 and 107 and side walls 108 each having the shoulder 89 formed thereon. The tray 83 mounts four settings 109, 110, 111, and 112 (Fig. 8) for handling four pimientoed or stuffed olives each, the settings corresponding to and being adapted to serve stations A (not shown), B, C, and D of my machine. As the settings are similar in structure and functions a description of one setting should suffice for a clear understanding of all of said olive settings. Thus setting 110 consists of four olive support plates 113 each having a stem 114 (Fig. 9) fixed to the central portion of the underside face thereof and depending therefrom through a hole 115 formed in the bottom 105 of the tray. The stem 114 is slidable in the hole 115 in the tray bottom and has a head or stop 116 formed on its lower end. A release disk 117 is rotatably mounted upon the bottom 105 of the tray subjacent the olive support plates by means of a centrally located stub shaft 118 that is anchored in the said bottom 105, the upper end 119 of the shaft 118 having four upstanding flat faces which project upwardly considerably above the olive support plates. A number of slots 120 are formed in the release disk 117 through which the stems 114 projects to permit limited oscillation of the disk on the shaft 118. An expansible spring 121 is helically coiled around each stem 114 and bears at one end against the bottom of each support plate 113 and has its opposed end in engagement with the upper face of the release disk 117.

The means for releasably holding an olive in position upon each olive support plate 113 comprises an L-shaped member 122 pivotally mounted intermediate its arms on an upstanding pin 123 that is in turn anchored upon the bottom 105 of the tray adjacent the periphery of the release disk. A short arm 124 of the L-shaped member is urged toward engagement with the end of a set screw 125 threaded in a lug 126 that is fixed to the disk 117 by means of a spring 127 (Fig. 10) encircling the pin 123 and bearing at one end against the short arm 124 whilst its opposed end bears against the part of the tray 83, as for instance, the end walls 105 or 107. A long arm 128 of the L-shaped member 122 extends parallel to one of the flat faces of the extended end 119 of the shaft 118, said long arm either overlapping or abutting a lug 129 projecting radially outwardly from the olive support plate 113.

As best shown in Figs. 8 and 11 the release disks 117 of settings 110 and 111 have inward projections 130 thereon and each has an upstanding cam portion 131 (Fig. 11) thereon which is engaged by a trip lever 132 pivotally mounted on a bracket 133 fixed to the bottom 105 of the tray. The lever 132 has a cam portion 133 at its free end which engages the corresponding cam portions 131, said cams and the disks 117 being held in normal inoperative positions by an expansile spring 134 bearing at its upper end against the bottom of the trip lever 132 and having its lower end in engagement with the bottom 104 of the tray. The release disks 117 for settings 109 and 112 are operated in unison with the release disks 110 and 111 by means of links 135 and 136, respectively, pivotally connected thereto.

Fig. 8 illustrates the condition of the tray settings and the tray mechanism when the tray is to be loaded. An operator will generally pick up an olive in each hand with the pimientoed end facing outwardly and press said olives down upon two opposed olive supporting plates 113 with the pimientoed sides facing outwardly toward the long arms 128 of the L-shaped members 122. This action will depress the support plates 113 against the action of the springs 121 thereby bringing the plates below the lower edge of the long arms 128 whereupon the springs 127 for the arms will cause the arms to move inwardly and secure the olives between the respective long arms and the opposed flat faces of the projecting head 119 of the shaft 118. Thus the tray of olives will be firmly and releasably held upon their respective olive support plates between the levers 122 and the shafts 118 and in positions to be picked up by the transfer mechanisms at the olive transfer station.

As illustrated in Figs. 1, 3 and 4 of the drawings the control rod 61 has an enlarged head or stop 137 at its lower end whilst its upper end freely passes through a sleeve 138 slidable in the frame member 25 and through a vertical bore formed in the head 20. The sleeve has a shoulder 139 at its upper end which engages an expansile spring 140 through which the upper end of the control rod 61 passes, said spring bearing against an inverted U-shaped bracket 141 bolted on the frame, said rod 61 passing through the bracket and being threaded at its upper end for engagement with a set nut 142. The control rod 64 has a stop 164 on its lower end and freely slides through a sleeve 143 carried by the projection 72 on ring 68 and also freely through a sleeve 144 slidable in the frame member 25 and freely passing through a vertical bore formed in the head 20 and the hole 51 formed in the head section 49. The upper end of the sleeve 144 has a shoulder 145 formed thereon which engages against an expansile spring 146, the upper end of said spring bearing against the underside of the bracket 141, said control rod 64 passing through the spring and the bracket and having a threaded upper end for engagement with a set nut 147.

A load and fire mechanism 148 for tripping the release lever of the tray at the proper time is shown in Figs. 4 and 5 as comprising a trip rod 149 vertically slidable in a bracket 150 fixed to the frame 25 and a bracket 151 fixed on the head 20. A compression spring 152 encircles the rod and rests upon a pin 153 projecting from both sides of the rod. When the head is in its upper position, shown in dotted lines in Fig. 5 the spring 152 is put under compression and at the same time a toggle lever 154 is pivoted on the frame 26 and moved under a head 155 formed on the upper end of the rod 149. As the head 20 descends and reaches an olive pick up position the toggle will be broken by the action of a spring 156 and permit the rod 149 to be fired at the tray release lever 132 by action of the spring 152.

The sequence of operations for the above described mechanism will now be set forth and with reference to Fig. 2 it is to be understood that the shafts 37 and 102 are rotated continuously and at the same speed in the direction of the arrows, that the endless belt 104 is continually moving and that the endless belt 84 is intermittently actuated in timed relation with the tray advancing bell crank lever 86 to present a tray 83 at the position 85 for advancement by said lever into olive pick up position beneath reciprocated heads 20 at four of the stations. Further the jar conveyor 27 is also intermittently actuated in timed relation with respect to the lever 86 and the heads 20 at the several stations whereby the lever will assume the dotted line out of the way position in Fig. 2 during movement of the jar advancing conveyor and the upper inoperative positions of the heads 20. In the positions indicated in Fig. 2 the bell crank lever 86 has just completed its feed movement of a tray 83 into operative position beneath the heads 20 whilst the shaft 37 has moved cam 36 to a position where the high point 38 has raised the head operating lever 30 to its uppermost position. With continued rotation of the cam 36 the lever 30 will lower the head to its olive pick up position, said position being illustrated in Fig. 1 of the drawings and set forth in enlarged detail in Fig. 9 of the drawings. In this position vacuums are created in the suction cups 81 on all the arms 53—53 and 65—65 through their connections with a suitable source of controlled negative pressure. Just as the heads 20 reach their olive pick up positions the load and fire mechanism 148 will be tripped by the spring 156 thus actuating the tray lever 132 which rotates the disks 117 thereby moving the long arms 128 away from above the lugs 129 on the olive support plates 113 so that said plates 113 will be projected upwardly under the influence of the coiled springs 121 to project the olives therefrom toward the suction cups 81 on the pick up arms 53. After the olives have been transferred from the plates 113 to the suction cups 81 the cam 36 again moves the high point 39 under the follower 35 on lever 30 thus raising the heads 20 to their uppermost positions and with reference to cams 91 and 100 it will be understood that at this particular time the bell crank lever 86 will at that time move rearwardly to pick up the next succeeding tray filled with stuffed or pimientoed olives whilst the lever 96 will move forwardly under the influence of the spring 101 to thereby drop the tray support 93 to its dotted inclined position in Fig. 2 thus permitting the emptied tray to move down the chute 103 to the conveyor 104 for refilling. As the tray begins its downward movement from tray supporting position to the dotted line position the heads 20 begin their downward descent with the arms thereof loaded with olives into the respective jars 28, the various positions of the descending heads and their mechanisms being best illustrated in Figs. 3 and 4 of the drawings.

The means carried by the head which become operable during descending movement of the heads to move the loaded arms 53—53 and 65—65 into restricted positions and on different levels for movement of the olives into the jars and to expand the arms into olive setting positions after the olives have entered the jars and moved toward packed positions therein comprises the rods 61 and 64, the sleeves 138 and 144 through which the rods 61 and 64, respectively, move and their associated hanger mechanism indicated in the drawing by the reference numerals 58 and 68. Referring to Fig. 1 it will be seen that the suction cups 81 and their connected arms 53 are all on the same level in each head so that all may be in positions to pick up olives from their respective tray elements. As has been pointed out the arms 53—53 are biased downwardly into radially contracted positions by the springs 78 and cams 77—77. These arms in olive pick up positions are moved upwardly against the actions of the springs 78 by means of the lever 58 which in the upper position of the head has its projection 60 bearing against the sleeve 138 which in turn is urged downwardly by an expansible spring 140. The effort of the spring 140 is stronger than the combined efforts of the springs 78—78, whereby the lever 60 will be rotated clockwise (Fig. 1) on its pivot 59 thus pulling the arms 53—53 upwardly through the hanger connections 54, 55, 57, and 58. In a reverse manner the arms 65—65 are pulled upwardly by springs 79—79 and when the head 20 is in its upper position the head of the sleeve 143 carried by the ring 68 will be depressed thus moving the disk 66 and arms 65—65 downwardly to bring the cups 81 carried by the arms 65—65 to the same level as the arms 53—53. Now with reference to Fig. 3 it will be noted that as the heads 20 descend the lever 58 will disengage sleeve 138 and the sleeve 143 will disengage sleeve 144 whereby the springs 78—78 are free to move the arms 53—53 downwardly and the springs 79—79 move the arms 65—65 upwardly thus placing the arms in staggered relationship whilst at the same time permitting the cam followers on the respective arms to move toward and assume their retracted positions on the cams 77—77 and 80—80. In this position, as indicated in Fig. 3, the olives carried by the arms 53—53 and 65—65 will be restricted radially and also on different levels so that there will be sufficient room for all the olives to be moved into radially restricted positions to enter the narrow neck of the jar 28. As the heads 20 move downwardly they eventually assume the position shown in Fig. 4 in which case the pairs of olives are again brought into a single layer by reason of the fact that the lever 68 engages the head 137 on the rod 61 to push the arms 65—65 downwardly whilst the sleeve 143 bears against the lever 58 to move it upwardly and move the arms 53—53 upwardly so that both arms assume the same level position. As the olives assume their packed position in the jar the vacuum in the cups is discontinued or changed to a positive pressure to release the olives from the cups whereafter the heads are raised by the cams 36 to their upper, inoperative positions thus reversing the action of the various arm controls to again restrict the arms as they move upwardly so that they positively pass the restricted mouth of the jars and again assume the positions shown in Fig. 1 for picking up the olives in the next succeeding tray. As the heads 20 move into their upper, inoperative positions the jar conveyor 27 is actuated to move each jar to the next succeeding station.

Referring now to Fig. 8 it will be seen that alternate groups of olives are disposed in an angular position with respect to adjacent stations. Thus the olive setting 109 is disposed at an angle of 45° with respect to the longitudinal dimension of the tray whilst the succeeding setting 110 is at right angles to said dimension.

It is contemplated that my machine may pack all sizes and kinds of olive jars and may be readily converted to pack two, three, four, six, eight, or ten to a layer or course and stagger them in proper relationship in the jars by merely utilizing different subheads 49 and levers 60 and 54.

It will be further appreciated that a machine of this character must have very positive action and that the mere failure of one arm and suction cup to pick up an olive and deposit it properly will defeat the purpose of the entire machine and it is therefore very important to the successful operation of my machine that the olives which are manually packed in the trays on their separate support plates 113 be projected by the suports 113 toward the suction cups so that proper alignment of the olives will be accomplished before the arms move the olives toward their packed positions, because such manual placement of olives sometimes cause the olives to be somewhat out of position for proper placement in the jars.

What is claimed is:

1. In a machine for packing olives in jars, a plurality of olive transfer stations, an intermittently operated conveyor for advancing a succession of jars from station-to-station and supporting successive jars in a packing position at each station, a head mounted for vertical reciprocated movement above a jar at each station, a plurality of olive pick up arms depending from each head, means for mounting each arm on its respective head for vertical shifting movement relative to the head, an olive retaining means on the end of each arm, a plurality of olive carrying trays, intermittently operated conveyor means for locating and supporting a tray in an olive pick up position intermediate the head and the jar at each station, a number of spring loaded olive supporting plates carried by each tray and each plate located on the tray in the path of an olive retaining means, power driven means operative during dwell periods of said conveyor means for lowering the heads in unison to bring the olive retaining means into olive transferring positions in proximity above the respective plates, co-operative means carried by the head and the tray to release the spring loaded plates and project the supported olives upwardly toward their respective olive retaining means, means for ejecting the empty trays from the tray conveyor after transfer of olives therefrom, means on the power driven means for lowering the heads in unison toward the jars and permit the olives in the retaining means to move toward their deposited positions in the jars, means carried by each head and operable during descending movement of the head to move the arms into restricted positions as the olives thereon enter the jar and to expand the arms into olive setting positions after the olives have entered the jar and are moved toward deposited positions therein, and means rendering the olive retaining means inoperative when the olives attain packed positions in the jar.

2. In a machine for packing olives in jars, a plurality of olive transfer stations, an intermittently operated conveyor for advancing a succession of jars from station-to-station and supporting successive jars in a packing position at each station, a head mounted for vertical reciprocating movement above a jar at each station, plural sets of olive pick up arms depending from each head, means for mounting each set on its respective head for vertical shifting movement relative to the head, an olive retaining means on the end of each arm, a plurality of olive carrying trays, intermittently operated conveyor means for locating and supporting a tray in an olive pick up position intermediate the head and the jar at each station, a number of spring biased olive supporting plates carried by each tray and each plate located on the tray in the path of an olive retaining means, power driven means operative during dwell periods of said conveyor means for lowering the heads in unison to bring the retaining means into olive transferring positions above and in proximity to the respective plates, co-operative means carried by the head and the tray to release the spring loaded plates and project the supported olives to their respective olive retaining means, means for ejecting the empty trays from the tray conveyor after transfer of olives therefrom, means on the power driven means for lowering the heads in unison toward the jars and move the olives in the retaining means toward their deposited positions in the jars, actuating means carried by the head and shiftable during descending movement of each head to move the sets of pick up arms into restricted positions with the sets on different levels as the olives thereon enter the jar and to expand the stems into olive setting positions on the same level after the olives have entered the jars and moved toward deposited positions therein, and means rendering the olive retaining means inoperative when the olives attain packed positions in the jar.

3. In a device for transferring a course of olives from a tray to packed position in a jar, a frame, a vertically reciprocated head movable on the frame from an upper, olive pick up position toward and away from a jar located below the pick up position, a first and second set of pick up arms depending from the head, a stem fixed to and depending from the head centrally of the arms, a guide disc fixed to the stem to provide vertically and laterally guided movements for the sets of arms relative to the head, a first hanger vertically slidable on the head, means for pivotally connecting the upper ends of the first set of arms to the said first hanger vertically slidable on the head, means for pivotally connecting the upper ends of the second set of arms to the said second hanger, olive retaining means on the lower ends of the arms, means for biasing the first and second sets of arms in opposite vertical directions and normally maintaining the olive retaining means on the two sets of arms on different levels, operating means on the head for moving the first and second hangers toward one another to bring the olive retaining means on the arms to a single level, and control means on the frame for actuating the operating means when the head is in its upper and lower positions.

4. In a device for transferring a course of olives from a tray to packed position in a jar, a frame, a vertically reciprocated head movable on the frame from an upper, olive pick up position toward and away from a jar located below the pick up position, a first and second set of pick up arms depending from the head, a stem fixed to and depending from the head centrally of the arms, a guide disc fixed to the stem to provide vertically and laterally guided movements for the sets of arms relative to the head, a first hanger vertically slidable on the head, means for pivotally connecting the upper ends of the first set of arms to the said first hanger, a second hanger vertically slidable on the head, means for pivotally connecting the upper ends of the second set of arms to the said second hanger, olive retaining means on the lower ends of the arms, means for biasing the first and second sets of arms in opposite vertical directions and normally maintaining the olive retaining means on the two sets of arms on different levels, cam means on the stem having inwardly restricted portions in contact with each of the arms when the olive retaining means on the arms are on different levels, operating means on the head for moving the first and second hangers toward one another to bring the olive retaining means on the arms to a single level, control means on the frame for actuating the operating means when the head is in its upper and lower positions, and said cam means having outwardly projecting portions that engage the arms when the olive retaining means on the arms are on the same level.

5. In the device set forth in claim 4 characterized by the fact that the operating means on the head are levers pivoted thereto and connected to each of the hangers, and the control means are vertically disposed rods mounted on the frame and having stops thereon for contacting and actuating the levers.

6. In the device set forth in claim 5 further characterized by the fact that the stops on the rods are vertically adjustable.

7. In a machine for packing olives in jars, a frame, a head mounted for vertical reciprocating movement on the frame from an olive pick up position toward and away from a jar, an olive pick up arm depending from the head, an olive suction cup on the lower end of the arm, an olive tray, means for moving the tray to the olive pick up position, said tray having an olive support plate located subjacent the suction cup and mounted on the tray for vertical movement, spring means biasing the support plate upwardly away from the tray and toward the suction cup on olive engaging arm pivotally mounted on the tray and adapted to hold the plate in depressed spring biased position when an olive is deposited thereon and held by said arm upon the plate, an arm release means on the tray, and trigger means on the frame operable by the head in its pick up position for operating the release means and to cause the support plate to bodily project the olive thereon toward and into engagement with the suction cup.

8. A machine for packing olives, a course at a time into jars comprising a series of olive oil transfer stations, an intermittently operated conveyor for advancing a succession of jars from station-to-station and supporting successive jars in a packing position at each station, a head mounted for vertical reciprocating movement above a jar at each station, a plurality of olive pick up arms depending from each head, the relative positions of the arms for adjacent stations being staggered with respect to their horizontal arrangement on the head, a suction cup on the end of each arm, a number of olive carrying trays each being adapted to serve a plurality of successive stations, intermittently operated conveyor means for locating and supporting a tray in a pick up position intermediate the heads and the jars at successive stations, each of said trays having plural settings of olive supporting plates, the several settings having their plates located subjacent the suction cups at the stations, means for mounting each plate on the tray for limited vertical movement, spring means for urging each plate upwardly away from the tray and toward a suction cup, an olive engaging arm pivotally mounted on the tray and adapted to hold the plate in a depressed, spring loaded position when an olive is deposited on the plate and held thereon by the arm, a release means on the tray connected to the olive engaging arms, and trigger means on the frame and operable by a head as it assumes its olive pick up position for operating the release means and cause the arms to release the olives and permit the plates to move under the influence of their springs to bodily project the olives upwardly against their respective suction cups.

No references cited.